(12) United States Patent
Bank et al.

(10) Patent No.: US 9,916,219 B2
(45) Date of Patent: *Mar. 13, 2018

(54) SYSTEM FOR SECURITY CONSCIOUS ENERGY DRAIN

(71) Applicant: International Business Machines Corporation, Armonk, NY (US)

(72) Inventors: Judith H. Bank, Cary, NC (US); Liam Harpur, Dublin (IE); Patrick J. O'Sullivan, Dublin (IE); Lin Sun, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 288 days.

This patent is subject to a terminal disclaimer.

(21) Appl. No.: 14/573,184

(22) Filed: Dec. 17, 2014

(65) Prior Publication Data

US 2016/0179171 A1    Jun. 23, 2016

(51) Int. Cl.
  *G06F 11/30*    (2006.01)
  *G06F 21/81*    (2013.01)
  (Continued)

(52) U.S. Cl.
  CPC ...... *G06F 11/3062* (2013.01); *G06F 11/3065* (2013.01); *G06F 11/3495* (2013.01); *G06F 21/55* (2013.01); *G06F 21/56* (2013.01); *G06F 21/81* (2013.01); *G06F 21/84* (2013.01); *G06F 1/3209* (2013.01); *G06F 1/3218* (2013.01); *G06F 11/3017* (2013.01); *G06F 2221/034* (2013.01)

(58) Field of Classification Search
  CPC .. G06F 1/3209; G06F 1/3218; G06F 11/3062; G06F 11/3065; G06F 11/3495; G06F 21/55; G06F 21/56; G06F 21/81; G06F 21/84; G06F 2221/034
  USPC ............ 713/300, 340; 714/48; 726/22
  See application file for complete search history.

(56) References Cited

U.S. PATENT DOCUMENTS

| 2002/0128975 A1* | 9/2002 | Klemba | G06Q 30/0601 705/57 |
| 2008/0122499 A1* | 5/2008 | Frew | H02H 3/207 327/143 |

(Continued)

OTHER PUBLICATIONS

List of IBM Patents or Applications Treated as Related.
(Continued)

*Primary Examiner* — Ji H Bae
(74) *Attorney, Agent, or Firm* — Terrile, Cannatti, Chambers & Holland, LLP; Stephen A. Terrile (57) ABSTRACT

A method, system and computer-usable medium are disclosed for detecting unanticipated consumption of power by a device. A first set of power consumption data is selected, followed by the collection of a second set of power consumption data, which respectively correspond to the consumption of a first and second amount of power by a device when it performs an authorized operation. The first and second sets of power consumption data are then compared to detect whether the second amount of power consumed is greater than the first amount of power consumed. If so, then a notification is generated, stating that the device has consumed an unanticipated greater amount of power as a result of performing the authorized operation.

12 Claims, 4 Drawing Sheets

(51) Int. Cl.
*G06F 21/84* (2013.01)
*G06F 1/32* (2006.01)
*G06F 11/34* (2006.01)
*G06F 21/55* (2013.01)
*G06F 21/56* (2013.01)

(56) References Cited

U.S. PATENT DOCUMENTS

| | | | | |
|---|---|---|---|---|
| 2012/0173911 | A1* | 7/2012 | Cerwinski | G06F 1/3203 713/340 |
| 2013/0198362 | A1* | 8/2013 | Abuelsaad | H04L 41/24 709/224 |
| 2013/0269032 | A1* | 10/2013 | Chasko | H04L 63/1491 726/23 |
| 2015/0052622 | A1* | 2/2015 | Cabler | G06F 21/558 726/34 |
| 2015/0113309 | A1* | 4/2015 | Grieco | G06F 11/3062 713/340 |

OTHER PUBLICATIONS

Aman Kansal et al., Virtual Machine Power Metering and Provisioning, Microsoft Research, 2010 http://research.microsoft.com/pubs/120435/joulemetervm.pdf.
U.S. Appl. No. 14/813,892, filed Jul. 30, 2015.

* cited by examiner

SYSTEM FOR SECURITY CONSCIOUS ENERGY DRAIN

BACKGROUND OF THE INVENTION

Field of the Invention

The present invention relates in general to the field of computers and similar technologies, and in particular to software utilized in this field. Still more particularly, it relates to a method, system and computer-usable medium for detecting unanticipated consumption of power by a device.

Description of the Related Art

In recent years, it has become common to use a wide variety of electrically-powered devices, such as smart phones, tablet computers, laptops, and other information processing systems to process, store and communicate various types of data. These devices typically use one or more software applications, each of which causes the device to consume a corresponding amount of electrical power when they are in use. However, the actual amount of power they may cause the device to consume can fluctuate due to various factors. For example, a graphics program in an idle mode (e.g., when minimized) may result in the device consuming a lesser amount of power than when it is in active use (e.g., when rendering complex graphics). Furthermore, use of the graphics program in other modes, such as during a demonstration or presentation, may result in the consumption of additional power by a hard drive or other peripherals associated with the device. As a result, the actual amount of power consumed by a device may be directly or indirectly affected by a given application's operating mode and the operations it is performing at different times. Other factors affecting the amount of power consumed by a device when an application is being used may include the type of processor the device uses, its operating system, memory configuration, or associated peripherals.

Current approaches for estimating the amount of power consumed by a device when performing various operations include using an average of the device's current draw at idle and full load. However, these approaches typically do not take into consideration the power demand individual applications may place on different devices when they are being used in various modes. As a result, ascertaining the anticipated power consumption of a particular device, using a known set of applications respectively operating in different modes at a given point in time, can prove difficult. In turn, this difficulty can create a variety of issues. For example, not knowing how much power a device consumes when performing different operations may make it difficult to manage its power usage. To continue the example, concurrently running two applications whose associated power usage is unknown may lead to unpredictable spikes in a device's power consumption. However, if it is known in advance that the two applications both result in high power consumption, then their respective operations may be alternated to moderate the device's power consumption.

As another example, lack of knowledge related to the power consumed by a device can mask the clandestine theft of data by surreptitiously implemented hardware or malware. To expand on this example, certain security agencies have been known to use a covert channel of radio waves that can be transmitted from tiny circuit boards or Universal Serial Bus (USB) cards secretly concealed in a device. In many cases, the device itself may not need to be in active use or be connected to the Internet for data to be stolen by the use of such hardware in conjunction with a data theft system. Likewise, various remote access Trojans are capable of keylogging, accessing a device's camera, stealing credentials stored in browsers, opening reverse shells, stealing files, manipulating processes, and viewing the user's desktop, all of which can be sent to a data theft system via the device's network adapter. In an attempt to prevent such activity, users are typically instructed to suspect malware when their devices are continuously busy during periods of user inactivity. However, it may be difficult for the user to discern the difference between malware activity and their device performing system maintenance or data backup operations in background mode. Furthermore, the power consumed by such hidden hardware or malware is typically masked by the consumption of power corresponding to the use of legitimate hardware and applications.

SUMMARY OF THE INVENTION

A method, system and computer-usable medium are disclosed for detecting unanticipated consumption of power by a device. In various embodiments, a first set of power consumption data is selected, followed by the collection of a second set of power consumption data, which respectively correspond to the consumption of a first and second amount of power by a first device when it performs an authorized operation. In these embodiments, the first and second sets of power consumption data are then compared to detect whether the second amount of power consumed is greater than the first amount of power consumed. If so, then a notification is generated, stating that the first device has consumed an unanticipated greater amount of power as a result of performing the authorized operation.

In one embodiment, the consumption of the unanticipated greater amount of power is associated with the first device operating irregularly when performing the authorized operation. In another embodiment, the consumption of the unanticipated greater amount of power is associated with the first device performing an unauthorized operation. In various embodiments, a third set of power consumption data is collected, which corresponds to a third amount of power by second device when it performs the authorized operation. In these embodiments, the first, second and third sets of power consumption data are then compared to detect whether the second amount of power consumed is greater than either the first or third amount of power consumed. In certain embodiments, the third set of power consumption data is crowd-sourced. In various embodiments, the first set of power consumption data may include power consumption data associated with the first device's hardware, operating system, installed applications, or associated peripherals.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A method, system and computer-usable medium are disclosed for detecting unanticipated consumption of power by a device. As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
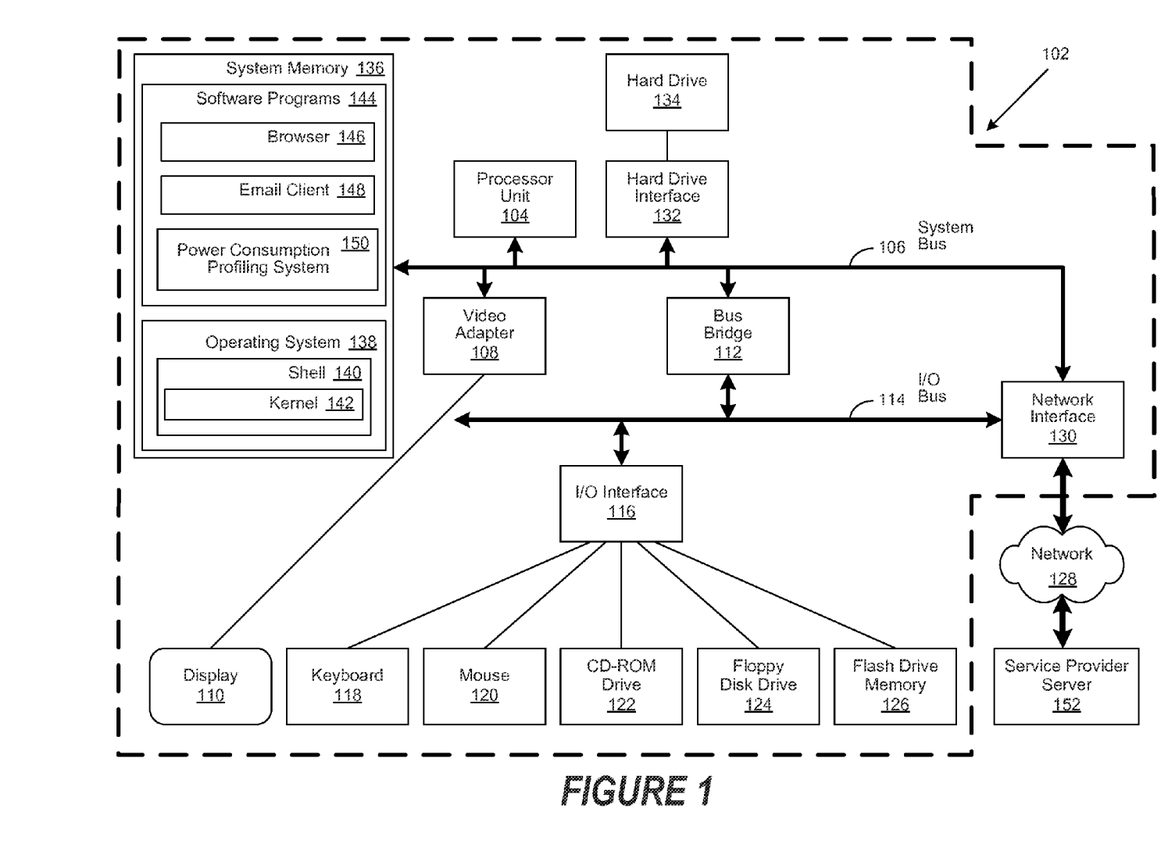
FIG. 1 depicts an exemplary client computer in which the present invention may be implemented.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management. Software programs 144 may include a browser 146 and email client 148. Browser 146 includes program modules and instructions enabling a World Wide Web (WWW) client (i.e., client computer 102) to send and receive network messages to the Internet using Hyper-Text Transfer Protocol (HTTP) messaging, thus enabling communication with service provider server 152. In various embodiments, software programs 144 may also include a power consumption profiling system 150. In these and other embodiments, the power consumption profiling system 150 includes code for implementing the processes described hereinbelow. In one embodiment, client computer 102 is able to download the power consumption profiling system 150 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit, scope and intent of the present invention.

Figure 2:
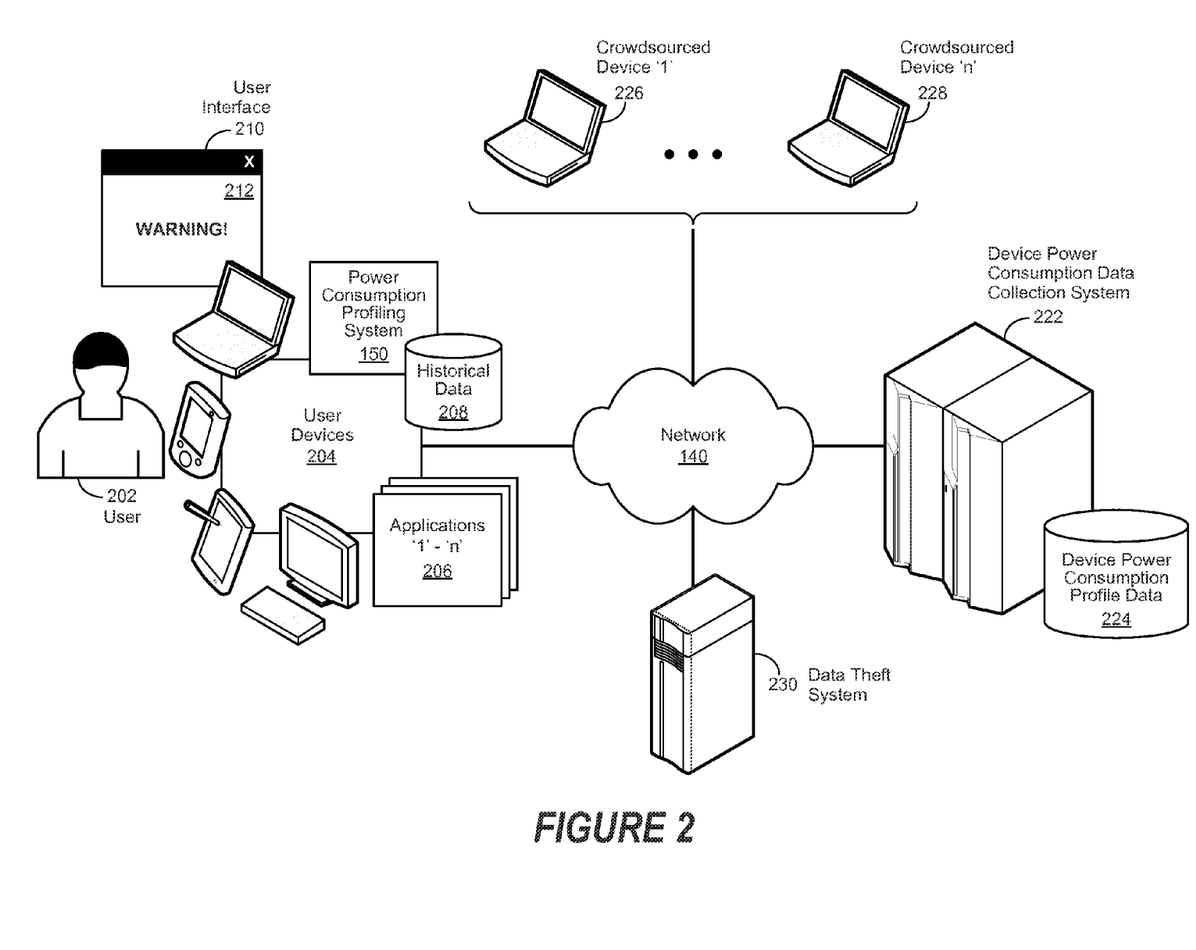
FIG. 2 is a simplified block diagram of a power consumption profiling system.

FIG. 2 is a simplified block diagram of a power consumption profiling system implemented in accordance with an embodiment of the invention. In various embodiments, the operation of a device is monitored to detect irregular or unanticipated consumption of power. As an example, the estimated amount of power required to perform a predetermined operation may be 1 watt, yet 1.5 watts may actually be consumed when the operation is performed. The consumption of more power than anticipated may indicate the pending failure of a hardware component, an operation that is not performing properly, unauthorized data access by malware, or clandestine transmission of sensitive data to a data theft system 230 by an illegally concealed hardware module, or a combination thereof. The possibility of these occurring is often masked by the irregular or unanticipated consumption of power by a device.

In this and other embodiments, a power consumption profiling system 150 is implemented to detect irregular or unanticipated power consumption by a device, such as user devices 204. In various embodiments, the method by which power consumption by the device is measured is a matter of design choice. For example, various system probes and monitors familiar to skilled practitioners of the art may be implemented to measure the power consumed by the device. In certain embodiments, the monitoring may be performed as a hardware operation, a software operation, or a combination thereof.

As used herein, a user device 204 refers to an information processing system such as a personal computer, a laptop computer, a tablet computer, a personal digital assistant (PDA), a smart phone, a mobile telephone, or other device that is capable of communicating and processing data. In various embodiments, the user device 204 is used to communicate data between the power consumption profiling system 150 and a device power consumption data collection system 222, described in greater detail herein, through the use of a network 140. In certain embodiments, the device power consumption data collection system 222 includes a repository of device power consumption profile data 224, likewise described in greater detail herein.

In various embodiments, the network 140 may be a public network, such as the Internet, a physical private network, a virtual private network (VPN), or any combination thereof. In certain embodiments, the network 140 may be a wireless network, including a personal area network (PAN), based on technologies such as Bluetooth or Ultra Wideband (UWB). In various embodiments, the wireless network may include a wireless local area network (WLAN), based on variations of the IEEE 802.11 specification, often referred to as WiFi. In certain embodiments, the wireless network may include a wireless wide area network (WWAN) based on an industry standard including various 3G technologies, including evolution-data optimized (EVDO), IEEE 802.16 (WiMAX), wireless broadband (WiBro), high-speed downlink packet access (HSDPA), high-speed uplink packet access (HSUPA), and emerging fourth generation (4G) wireless technologies. Skilled practitioners of the art will realize that many such embodiments are possible and the foregoing is not intended to limit the spirit, scope or intent of the invention.

In various embodiments, a baseline power consumption profile is generated for the device, which is then used as a reference for detecting irregular or unanticipated consumption of power. In these embodiments, the generation of the baseline power consumption profile is begun by first collecting data associated with the device's unique identifier, its hardware configuration, its operating system, installed applications, such as applications '1' through 'n' 206, and associated peripherals. In various embodiments, the data associated with the device's unique identifier may include its model or product identifier, its serial number, its service tag number, its Media Access Control (MAC) number, its International Mobile Equipment Identifier (IMEI) number, or any combination thereof.

In certain embodiments, the data associated with the device's hardware configuration may include the model or class of its Central Processing Unit (CPU), its memory configuration, a listing of associated peripherals and their unique identifiers, and other associated hardware, such as interface modules. In these and other embodiments, the associated peripherals and associated hardware may be embedded in the device or operably coupled to the device. For example, the device may have either an internal or external hard drive, or both, a wirelessly-coupled printer, and so forth. Likewise, in various embodiments, the data associated with the device's operating system (OS) and installed applications, such as applications '1' through 'n' 206, may include version numbers, registry entries, patch identifiers, installation dates, application program names, configuration information, and associated user settings. Skilled practitioners of the art will recognize that many such embodiments are possible and the foregoing is not intended to limit the spirit, scope or intent of the invention.

The collected data is then processed to generate a baseline power consumption profile for the device. The method by which the baseline power consumption profile is generated, and which of the collected data associated with the device it contains, is a matter of design choice. Ongoing operations are then performed to collect baseline power consumption data associated with the device. As used herein, baseline power consumption data broadly refers to data associated with the power consumed by the device's hardware, operating system, installed applications, such as applications '1' through 'n' 206, and associated peripherals under known and anticipated operating conditions. In various embodiments, the known and anticipated operating conditions may include the device operating in various modes, such as when it is idle, under full load, running one or more applications, such as applications '1' through 'n' 206, processing various types of data, communicating data, or performing data storage operations. In certain embodiments, the known and anticipated operating conditions may include confirmation that neither unauthorized hardware nor malware has been surreptitiously implemented, directly or indirectly, with the device. The method by which such confirmation is realized is a matter of design choice. Those of skill in the art will recognize that many such embodiments are possible and the foregoing is not intended to limit the spirit, scope or intent of the invention.

Ongoing operations are then performed to populate the baseline power consumption profile with the baseline power consumption data as it is collected. The amount and type of baseline power consumption data that is used to populate the baseline power consumption profile, the period(s) of time during which it is collected, and the operating conditions under which it is collected, is a matter of design choice. In various embodiments, the populated baseline power consumption profile is provided in its current state as a reference power consumption profile to the device power consumption data collection system 222. In certain embodiments, the reference power consumption profile is stored in the repository of device power consumption profile data 224 for later retrieval and use.

As used herein, a reference power consumption profile broadly refers to a populated baseline power consumption profile associated with a first device that can be used as a reference for the anticipated consumption of power by a second device. In various embodiments, the reference power consumption profile contains data associated with the first device's hardware configuration, operating system, installed applications, associated peripherals, and their related power consumption. In one embodiment, the reference power consumption profile is associated with a single device. In another embodiment, the reference power consumption profile may be associated with a group of devices that are identical. As an example, all devices in the group may have the same hardware configuration, the same applications installed, and the same associated peripherals. In yet another embodiment, the devices in the group may be substantively alike. For example, all of the devices in the group may have the same hardware configuration, one or more installed members of the same set of applications, and the same associated peripherals.

In various embodiments, the reference baseline power consumption profile may include power consumption data provided by the manufacturer of the device. In certain embodiments, the reference baseline power consumption profile is crowdsourced from a plurality of devices, such as crowdsourced devices '1' 226 through 'n' 228. As used herein, crowdsourcing broadly refers to the process of obtaining needed services, content or other information by soliciting contributions from a group of users, devices or systems. Skilled practitioners of the art will be aware that crowdsourcing is often used to subdivide tedious tasks, processes or operations across multiple contributors, each of which adds a portion of value to the greater result. In various embodiments, each of the crowdsourced devices '1' 226 through 'n' 228 provides their respective populated baseline power consumption profiles to the device power consumption data collection system 222. Once received, they are stored in the repository of device power consumption profile data 224 as reference power consumption profiles. In various embodiments, the network 140 is used by the crowdsourced devices '1' 226 through 'n' 228 to respectively provide their populated baseline power consumption profiles to the device power consumption data collection system 222.

In certain embodiments, two or more reference power consumption profiles may be processed by the device power consumption data collection system 222 to generate a reference power consumption profile that is not uniquely associated with an individual crowdsourced device '1' 226 through 'n' 228. As an example, three of the crowdsourced devices '1' 226 through 'n' 228 may have the same hardware configuration and OS version, yet each has a different application installed. As a result, each of the three devices would provide a different populated baseline power profile. In this example, the device power consumption data collection system 222 would process the three populated baseline power consumption profiles to generate a reference power consumption profile that included all three applications. To continue the example, the newly-generated reference power consumption profile may most closely match the populated baseline power consumption profile of a device, such as a user device 204, which may have all three of the applications installed. Those of skill in the art will recognize that many such embodiments are possible and the foregoing is not intended to limit the spirit, scope or intent of the invention.

In various embodiments, operations for detecting unanticipated consumption of power by a device are begun by first determining whether a populated baseline power consumption profile exists for the device, such as an individual user device 204. In one embodiment, a baseline power consumption profile exists, but is not yet populated with baseline power consumption data for the device. In this embodiment, the baseline power consumption profile is populated with baseline power consumption data, as described in greater detail herein, before the process is continued. If it is determined that a baseline power consumption profile does not currently exist for the device, then one is generated and populated with baseline power consumption data.

A determination is then made whether to retrieve a reference power consumption profile for the device. If so, then the power consumption profiling system 150 submits a request to the device power consumption data collection system 222 for the reference power consumption profile that most closely matches the populated baseline power consumption profile for the device. In one embodiment, the device's populated baseline power consumption profile is already stored in the repository of device power consumption profile data 224 as a reference power consumption profile. In another embodiment, the power consumption profiling system 150 provides the populated baseline power consumption profile for the device to the device power consumption data collection system 222 along with the request.

In yet another embodiment, an older version of the device's populated baseline power consumption profile is already stored in the repository of device power consumption profile data 224 as a reference power consumption profile. In this embodiment, the power consumption profiling system 150 provides an updated version of the populated baseline power consumption profile to the device power consumption data collection system 222 along with the request. Once received, the updated version of the populated baseline power consumption profile replaces the older version of the device's populated baseline power consumption profile in the repository of device power consumption profile data 224 as an updated reference power consumption profile. The device power consumption data collection system 222 then processes the device's populated baseline power consumption profile received from the power consumption profiling system 150, or retrieved from the repository of device power consumption profile data 224, to locate the closest-matching reference power consumption profile stored in the repository of device power consumption profile data 224. Once located, it is then provided by the device power consumption data collection system 222 to the power consumption profiling system 150.

Ongoing operations are then performed to monitor operational power consumption by the device and to collect associated data. The operational power consumption that is monitored, and the associated data that is collected, is a matter of design choice. As used herein, operational power consumption data broadly refers to data associated with the power consumed by the device as a result of the device being used to perform various operations subsequent to the generation of an associated baseline power consumption profile. In various embodiments, the performance of such operations may result in irregular or unanticipated power consumption by the device's hardware, operating system, installed applications, such as applications '1' through 'n' 206, and associated peripherals. For example, in certain embodiments, an unanticipated amount of power may be consumed by the device as a result of unauthorized hardware or malware having been surreptitiously implemented, directly or indirectly, with the device. As another example, power consumption by the device may be irregular, which may indicate an imminent failure of an associated peripheral, such as a hard drive. Skilled practitioners of the art will recognize that many such embodiments are possible and the foregoing is not intended to limit the spirit, scope or intent of the invention.

Ongoing operations are then performed to store the operational power consumption data as it is collected for subsequent comparison and analysis. The method by which the operational power consumption data is stored, and the format in which it is stored, is a matter of design choice. In various embodiments, the collected operational power consumption is stored in a repository of historical data 208. In certain embodiments, a subset of the collected operational power consumption data is stored in the repository of historical data 208. For example, operational power consumption data associated with the top 'n' number of users of a predetermined set of sensitive data may be selected for storage in the repository of historical data 208.

Ongoing analysis operations are then performed to compare the collected operational power consumption data to the baseline power consumption profile, or the reference power consumption profile, or a combination of the two. In various embodiments, the device's populated baseline power consumption profile may be selected, or alternatively, a previously-retrieved reference power consumption profile may be selected for the comparison. In certain embodiments, both the device's populated baseline power consumption profile and the previously-retrieved reference power consumption profile may be selected for the comparison.

As an example, the device's baseline power consumption profile may contain baseline power consumption data associated with a first application and a second application, while a retrieved reference power consumption profile may only contain power consumption data associated with the second application. In this example, operational power consumption data associated with the use of the first application is compared to its corresponding baseline power consumption data contained in the device's baseline power consumption profile, as it would be selected as the best match. To continue the example, operational power consumption data associated with the use of the second application may be compared to its corresponding power consumption data contained in the baseline power consumption profile, or the previously-retrieved reference power consumption profile, as either may be selected as the best match. To further the example, both the baseline power consumption profile and the previously-retrieved reference power consumption profile may be selected for the comparison, as any variance indicated as a result of the comparison operations may indicate irregular or unanticipated power consumption by the device.

In one embodiment, scheduling data is used in the performance of the analysis and comparison operations. For example, the device's operating system (OS), an application programming interface (API) associated with an application, such as applications '1' through 'n' 206, or a work queue, may be implemented to determine which applications are used, during what time periods, either on a one-time or recurring basis. To continue the example, a data backup application may be scheduled to make daily backups at 3:00 AM every morning. In this embodiment, an application, such as applications '1' through 'n', that is being used at an irregular or unanticipated time would result in consumption of power by the device that is likewise irregular or unanticipated, which in turn may indicate unauthorized use of the device.

In another embodiment, resource usage data is used in the performance of the analysis and comparison operations. For example, associated peripherals using excessive amounts of power, such as a disobedient router or USB hub, would be considered suspicious when the device is otherwise inactive or shut down. In certain embodiments, a power consumption profiling system 150 is embedded in an external peripheral, or a separate device, to monitor the device for irregular or unanticipated power consumption. For example, the device may consume a low amount of power during a time period of time when it would be expected to be idle.

In yet another embodiment, resource usage correlation data associated with a predetermined set of device hardware, applications, such as applications '1' through 'n' 206, and associated peripherals is used in the performance of the analysis and comparison operations. For example, a particular application, such as applications '1' through 'n' 206, may typically result in high CPU usage when it is performing numerical analysis, yet disk read/write operations and communications bandwidth usage is low. To further the example, high CPU usage accompanied by high read/write operations and high bandwidth usage might be suspicious and indicate unauthorized behavior.

In still yet another embodiment, historical power consumption log files are used in the performance of the analysis and comparison operations. For example, the log files may be analyzed to determine the power consumption associated with various applications that were previously used for a similar type of activity. As an example, a WiFi unit may have been surreptitiously embedded in a USB cable for the purpose of using a network 140 to transmit stolen data to a data theft system 230. In this example, operational power consumption data is compared to historical power consumption log files as follows:

DeviceID→YTS-67-01
Rated Watt/MB→350 mA
TaskDescription→Transfer 382 MB data to external disk
Current MB xfer→3.5 MB/s
Current Watt/MB→1002 mA
Current Status→"Warning!!!"

In certain embodiments, the log files of historical power consumption are crowdsourced as described in greater detail herein. In these embodiments, the use of similar devices and applications by members of the crowd may be variable, which in turn may make it difficult to detect anomalies unless the operational power consumption data associated with the use of a device differed significantly from that provided by the crowd. Regardless, such historical log files may provide useful power consumption data that includes various combinations of devices, applications, such as applications '1' through 'n' 206, and processes that have been monitored over time during low, normal and extreme load conditions. Furthermore, such historical log files may provide likewise useful data related to user activity and net consumption of incoming electrical power. Those of skill in the art will recognize that many such embodiments are possible and the foregoing is not intended to limit the spirit, scope or intent of the invention.

A determination is then made whether any unanticipated or irregular consumption of power by the device has been detected. If so, then a notification 212 of such is generated. In various embodiments, the notification 212 may suggest the performance of one or more actions to one or more users 202. In certain embodiments, the notification 212 may be presented to the user 202 in a User Interface (UI) 210 associated with the device, such as an individual user device 204. In various embodiments, the notification 212 may be provided to the one or more users 202 through the use of an electronic communication, such as an email of Short Message Service (SMS) message. In one embodiment, the notification 212 may include a security alert if the irregular or unanticipated power consumption is associated with a process or data that has been predetermined to be sensitive.

In another embodiment, the notification 212 may request authorization from a user 202 before proceeding. As an example, the notification 212 may ask if the current operation should be continued, as it has historically only consumed 1 watt of power, yet 1.5 watts have already been consumed and the operation is not yet completed. In yet another embodiment, the notification 212 may include an alert that the failure of a hardware component is imminent, or that an application is behaving irregularly, if the irregular or unanticipated power consumption is associated with an operation that is likely benign, but still above its anticipated power consumption.

In various embodiments, the unanticipated power consumption profiling system 150 is implemented to initiate proactive operations in the event that irregular or unanticipated power consumption is detected. In these embodiments, the proactive operations may include launching an antivirus scan or a malware detection application to check for altered registry entries, shutting off all power to the device, or powering down associated network devices, such as a router. In certain embodiments, the unanticipated power consumption profiling system 150 is implemented to use either the populated baseline power consumption profile, the reference power consumption profile, the collected operational power data, or a combination thereof, to perform predictive analytics to anticipate how much power will be consumed as a result of using a predetermined application. Skilled practitioners of the art will recognize that many such embodiments are possible and the foregoing is not intended to limit the spirit, scope or intent of the invention.

In various embodiments, the power consumption profiling system 150 is implemented in a virtualization environment. In certain of these embodiments, a power consumption policy familiar to those of skill in the art may be implemented for a predetermined virtual machine (VM), workload, computer node, or some combination thereof. For example, the power consumption policy may grant all VMs within workload 'x' an allocated 'y' number of watts per hour during a first time interval and 'z' number of watts per hour during a second time interval. In this example, power consumption by the VMs that exceeded the allocation would be considered irregular or unanticipated, which would result in the generation of a notification, as described in greater detail herein.

Figure 3:
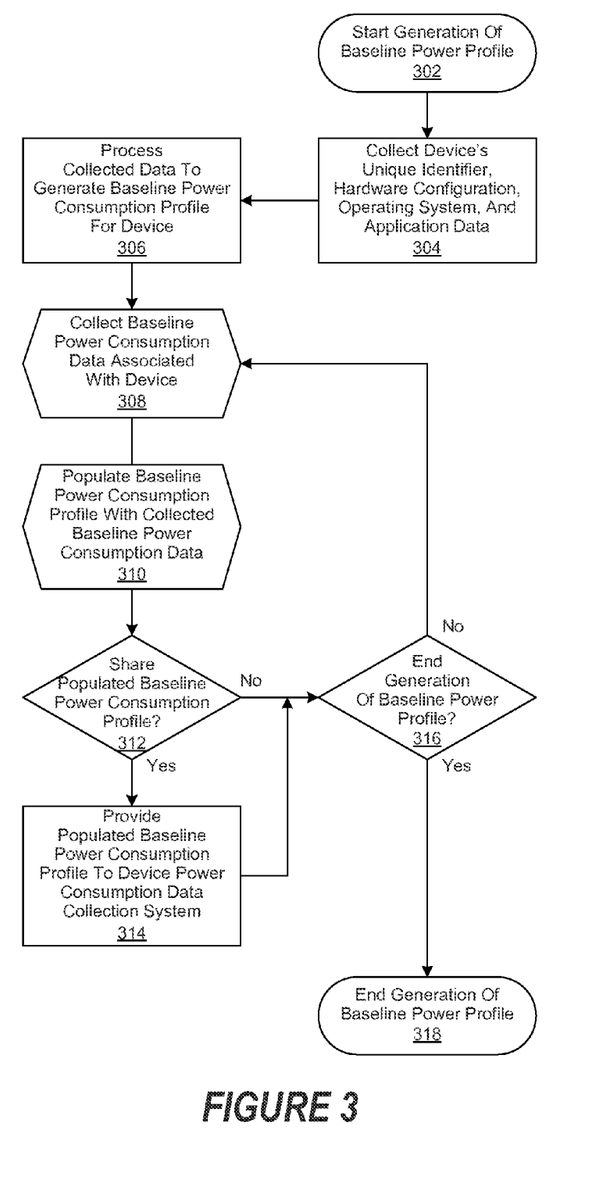
FIG. 3 is a generalized flowchart of the performance of operations for generating a baseline power consumption profile for a device.

FIG. 3 is a generalized flowchart of the performance of operations implemented in accordance with an embodiment of the invention for generating a baseline power consumption profile for a device. In this embodiment, operations for generating a baseline power consumption profile for a device are begun in step 302, followed by the collection of data associated with the device's unique identifier, its hardware configuration, its operating system, installed applications, and associated peripherals in step 304.

The collected data is then processed in step 306 to generate a baseline power consumption profile for the device. The method by which the baseline power consumption profile is generated, and which collected data associated with the device it contains, is a matter of design choice. Ongoing operations are then performed in step 308 to collect baseline power consumption data associated with the device. Ongoing operations are then performed in step 310 to populate the baseline power consumption profile with the baseline power consumption data collected in step 308. The amount and type of baseline power consumption data that is used to populate the baseline power consumption profile, the period of time during which it is collected, and the operating conditions under which it is collected, is a matter of design choice.

A determination is then made in step 312 whether to provide the populated power consumption profile in its current state as a reference power consumption profile. If so, then the populated baseline power consumption profile is provided in step 314 to a device power consumption data collection system, described in greater detail herein. Thereafter, or if it was determined in step 312 not to share the populated baseline power consumption profile, then a determination is made in step 316 whether to end operations for generating a baseline power consumption profile for the device. If not, then the process is continued, proceeding with step 308. Otherwise, operations for generating a baseline power consumption profile for the device are ended in step 318.

Figure 4:
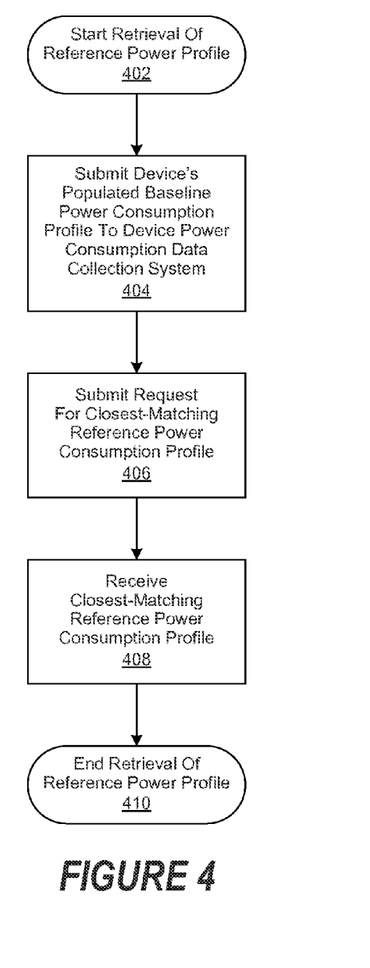
FIG. 4 is a generalized flowchart of the performance of operations for retrieving a reference power consumption profile for a device.

FIG. 4 is a generalized flowchart of the performance of operations implemented in accordance with an embodiment of the invention for retrieving a reference power consumption profile for a device. In this embodiment, operations for retrieving a reference power consumption profile for a device are begun in step 402, followed by the submission of the device's populated baseline power consumption profile, described in greater detail herein, to a device power consumption data collection system in step 404. A request is then submitted to the device power consumption data collection system for a reference power consumption profile that most closely matches the device's baseline power consumption profile in step 406. The requested reference power consumption profile is then received in step 408 and operations for retrieving a reference power consumption profile for the device are ended in step 410.

Figure 5:
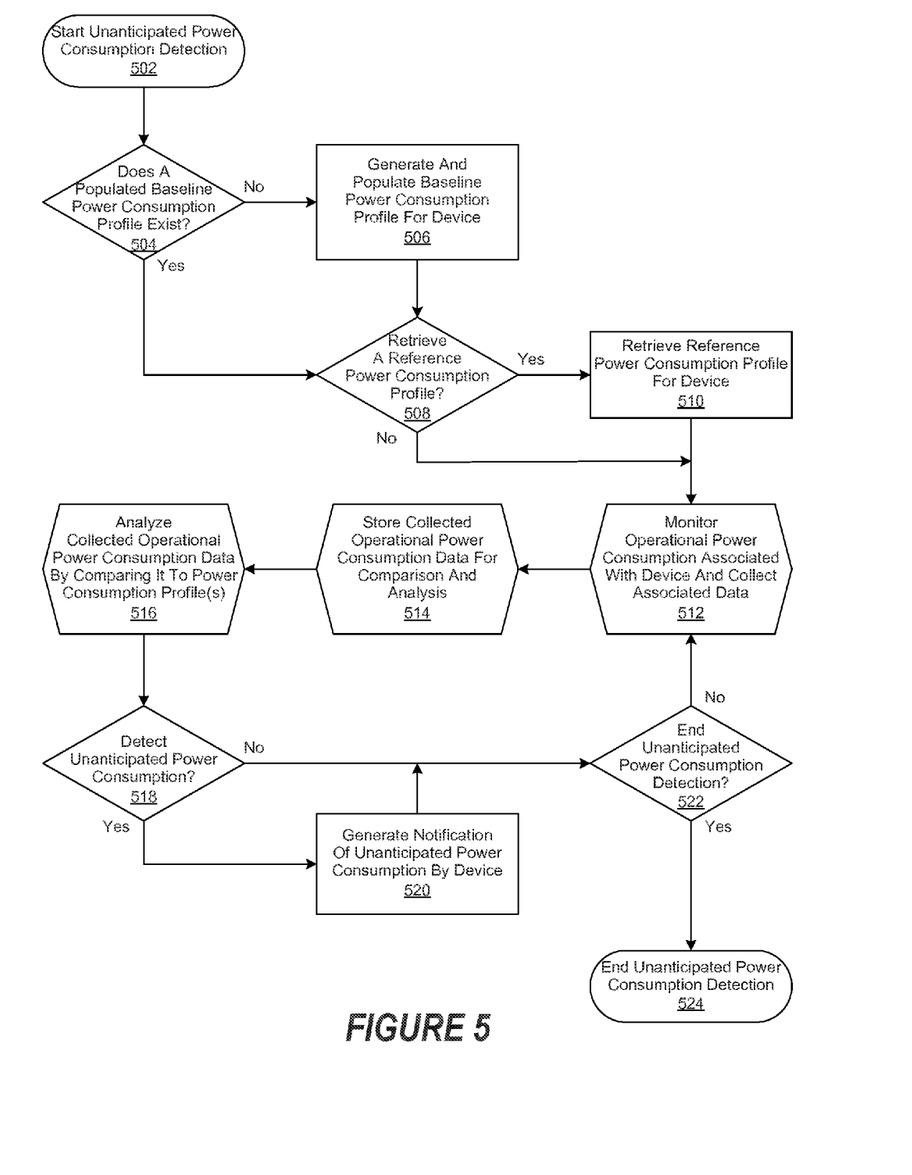
FIG. 5 is a generalized flowchart of the performance of operations for detecting unanticipated consumption of power by a device.

FIG. 5 is a generalized flowchart of the performance of operations implemented in accordance with an embodiment of the invention for detecting unanticipated consumption of power by a device. In this embodiment, operations for detecting unanticipated consumption of power by a device are begun in step 502, followed by a determination being made in step 504 whether a populated baseline power consumption profile exists for the device. In one embodiment, a baseline power consumption profile exists, but is not yet populated with baseline power consumption data for the device. In this embodiment, the baseline power consumption profile is populated with baseline power consumption data, as described in greater detail herein, before the process is continued. If it is determined in step 504 that a baseline power consumption profile does not currently exist for the device, then one is generated and populated with baseline power consumption data in step 506.

Thereafter, or if it was determined in step 504 that a populated baseline power consumption profile exists for the device, a determination is then made in step 508 whether to retrieve a reference power consumption profile for the device. If so, then the closest-matching reference power consumption profile for the device is retrieved in step 510. Thereafter, or if it was determined in step 508 not to retrieve a reference power consumption profile for the device, then ongoing operations are performed in step 512 to monitor operational power consumption by the device and to collect associated data. Ongoing operations are then performed in step 514 to store the operational power consumption data as it is collected for subsequent comparison and analysis. The method by which the operational power consumption data is stored, and the format in which it is stored, is a matter of design choice.

Ongoing analysis operations are then performed in step 516 by comparing the collected operational power consumption data to the baseline power consumption profile, or the reference power consumption profile, or a combination of the two, as described in greater detail herein. A determination is then made in step 516 whether any unanticipated or irregular consumption of power by the device has been detected. If so, then a notification of such is generated. Once the notification has been generated in step 520, or if irregular or unanticipated power consumption is not detected in step 518, then a determination is made in step 522 whether to end unanticipated power consumption detection operations. If not, then the process is continued, proceeding with step 512. Otherwise, unanticipated power consumption detection operations are ended in step 524.

Although the present invention has been described in detail, it should be understood that various changes, substitutions and alterations can be made hereto without departing from the spirit and scope of the invention as defined by the appended claims.

What is claimed is:

1. A system comprising:
 a processor;
 a data bus coupled to the processor; and
 a computer-usable medium embodying computer program code, the computer-usable medium being coupled to the data bus, the computer program code used for detecting unanticipated consumption of power by a device and comprising instructions executable by the processor and configured for:
  selecting a first set of power consumption data associated with an operation performed by a first device, the first set of power consumption data corresponding to a first amount of power consumed by the first device when performing the operation;
  selecting a second set of power consumption data associated with the operation being performed by a second device, the second set of power consumption data corresponding to a second amount of power consumed by the second device when performing the operation;
  collecting a third set of power consumption data associated with the operation, the third set of power consumption data corresponding to a third amount of power consumed by the first device when performing the operation;
  comparing the first, second and third sets of power consumption data;
  if the comparing detects that the third amount of power consumed is greater than either the first or second amount of power consumed:
   generating a notification that the first device has consumed an unanticipated greater amount of power when the third amount of power consumed is greater than either the first or second amount of power consumed; and
   managing power usage of the first device in response to the notification;
  wherein the second set of power consumption data is crowdsourced from a plurality of crowdsourced devices via a crowdsourcing operation, the crowdsourcing operation comprising obtaining content by soliciting contributions from a group of systems, the crowdsourcing subdividing obtaining of the second set of power consumption data across a plurality of contributors, each of the plurality of contributors adding a portion of value to a greater result.

2. The system of claim 1, wherein:
 the consumption of the unanticipated greater amount of power is associated with the first device operating irregularly when performing an authorized operation.

3. The system of claim 1, wherein:
 the consumption of the unanticipated greater amount of power is associated with the first device performing an unauthorized operation.

4. The system of claim 1, wherein the first set of power consumption data comprises power consumption data associated with at least one member of the set of:
 the first device's hardware;
 the first device's operating system;
 the first device's installed applications; and
 the first device's associated peripherals.

5. The system of claim 1, wherein:
 the notification comprises a security alert indicating the consumption of the unanticipated greater amount of power is associated with a process that has been determined to be sensitive.

6. A non-transitory, computer-readable storage medium embodying computer program code, the computer program code comprising computer executable instructions configured for:
 selecting a first set of power consumption data associated with an operation performed by a first device, the first set of power consumption data corresponding to a first amount of power consumed by the first device when performing the operation;
 selecting a second set of power consumption data associated with the operation being performed by a second device, the second set of power consumption data corresponding to a second amount of power consumed by the second device when performing the operation;
 collecting a third set of power consumption data associated with the operation, the third set of power consumption data corresponding to a third amount of power consumed by the first device when performing the operation;

comparing the first, second and third sets of power consumption data;

if the comparing detects that the third amount of power consumed is greater than either the first or second amount of power consumed:

generating a notification that the first device has consumed an unanticipated greater amount of power when the third amount of power consumed is greater than either the first or second amount of power consumed; and managing power usage of the first device in response to the notification;

wherein the second set of power consumption data is crowdsourced from a plurality of crowdsourced devices via a crowdsourcing operation, the crowdsourcing operation comprising obtaining content by soliciting contributions from a group of systems, the crowdsourcing subdividing obtaining of the second set of power consumption data across a plurality of contributors, each of the plurality of contributors adding a portion of value to a greater result.

7. The non-transitory, computer-readable storage medium of claim 6, wherein:

the consumption of the unanticipated greater amount of power is associated with the first device operating irregularly when performing an authorized operation.

8. The non-transitory, computer-readable storage medium of claim 6, wherein:

the consumption of the unanticipated greater amount of power is associated with the first device performing an unauthorized operation.

9. The non-transitory, computer-readable storage medium of claim 6, wherein the first set of power consumption data comprises power consumption data associated with at least one member of the set of:

the first device's hardware;
the first device's operating system;
the first device's installed applications; and
the first device's associated peripherals.

10. The non-transitory, computer-readable storage medium of claim 6, wherein the computer executable instructions are deployable to a client system from a server system at a remote location.

11. The non-transitory, computer-readable storage medium of claim 6, wherein the computer executable instructions are provided by a service provider to a user on an on-demand basis.

12. The non-transitory, computer-readable storage medium of claim 6, wherein:

the notification comprises a security alert indicating the consumption of the unanticipated greater amount of power is associated with a process that has been determined to be sensitive.

* * * * *